US012571919B2

(12) United States Patent
Takaki

(10) Patent No.: US 12,571,919 B2
(45) Date of Patent: Mar. 10, 2026

(54) OVERHEAD-STRUCTURE RECOGNITION DEVICE

(71) Applicant: DENSO CORPORATION, Kariya-city (JP)

(72) Inventor: Masanari Takaki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 804 days.

(21) Appl. No.: 18/050,903

(22) Filed: Oct. 28, 2022

(65) Prior Publication Data

US 2023/0074028 A1     Mar. 9, 2023

Related U.S. Application Data

(63) Continuation of application No. PCT/JP2021/017136, filed on Apr. 30, 2021.

(30) Foreign Application Priority Data

May 1, 2020     (JP) ................................. 2020-081325

(51) Int. Cl.
G01S 17/93          (2020.01)
B60W 10/18          (2012.01)
(Continued)

(52) U.S. Cl.
CPC ........... G01S 17/931 (2020.01); B60W 10/18 (2013.01); B60W 30/09 (2013.01); B60W 30/146 (2013.01); B60W 40/04 (2013.01); G01S 17/42 (2013.01); G01S 17/87 (2013.01); B60W 2420/403 (2013.01); B60W 2420/408 (2024.01);
(Continued)

(58) Field of Classification Search
CPC ........ G01S 17/931; G01S 17/42; G01S 17/87; G01S 13/865; G01S 13/931; B60W 10/18; B60W 30/09; B60W 30/146; B60W 40/04; B60W 2420/403; B60W 2420/408; B60W 2554/20; B60W 2556/20; B60W 2556/40;
(Continued)

(56) References Cited

U.S. PATENT DOCUMENTS 12,422,563 B2 *   9/2025   Zhang ................... G01S 7/4815

FOREIGN PATENT DOCUMENTS

JP          2010-127835 A          6/2010
JP          2011-232230 A          11/2011
JP          2013-053946 A          3/2013

* cited by examiner

*Primary Examiner* — Tony Ko
(74) *Attorney, Agent, or Firm* — Maschoff Brennan

(57)          ABSTRACT

In an overhead-structure recognition device to be mounted to a vehicle, a determination unit is configured to, in response to there being, among specific pieces of range point data each having a direction variable indicating a predefined direction, a predefined number or more of pieces of range point data each having a distance variable taking a plurality of values, determine that an object of interest corresponding to a subset of interest of pieces of range point data is an overhead structure. The predefined direction is a direction such that a horizontal angle difference from a direction indicated by the direction variable of the piece of range point data corresponding to the object of interest is within a predefined angle range and an angle with respect to a vertical direction is greater than an angle between the vertical direction and a direction of travel of the vehicle.

8 Claims, 6 Drawing Sheets

(51) Int. Cl.

| | |
|---|---|
| *B60W 30/09* | (2012.01) |
| *B60W 30/14* | (2006.01) |
| *B60W 40/04* | (2006.01) |
| *G01S 17/42* | (2006.01) |
| *G01S 17/87* | (2020.01) |
| *G01S 17/931* | (2020.01) |

(52) U.S. Cl.
CPC ..... *B60W 2554/20* (2020.02); *B60W 2556/20* (2020.02); *B60W 2556/40* (2020.02)

(58) Field of Classification Search
CPC ........ B60W 2554/802; B60W 30/0956; G08G 1/16
See application file for complete search history.

FIG.3

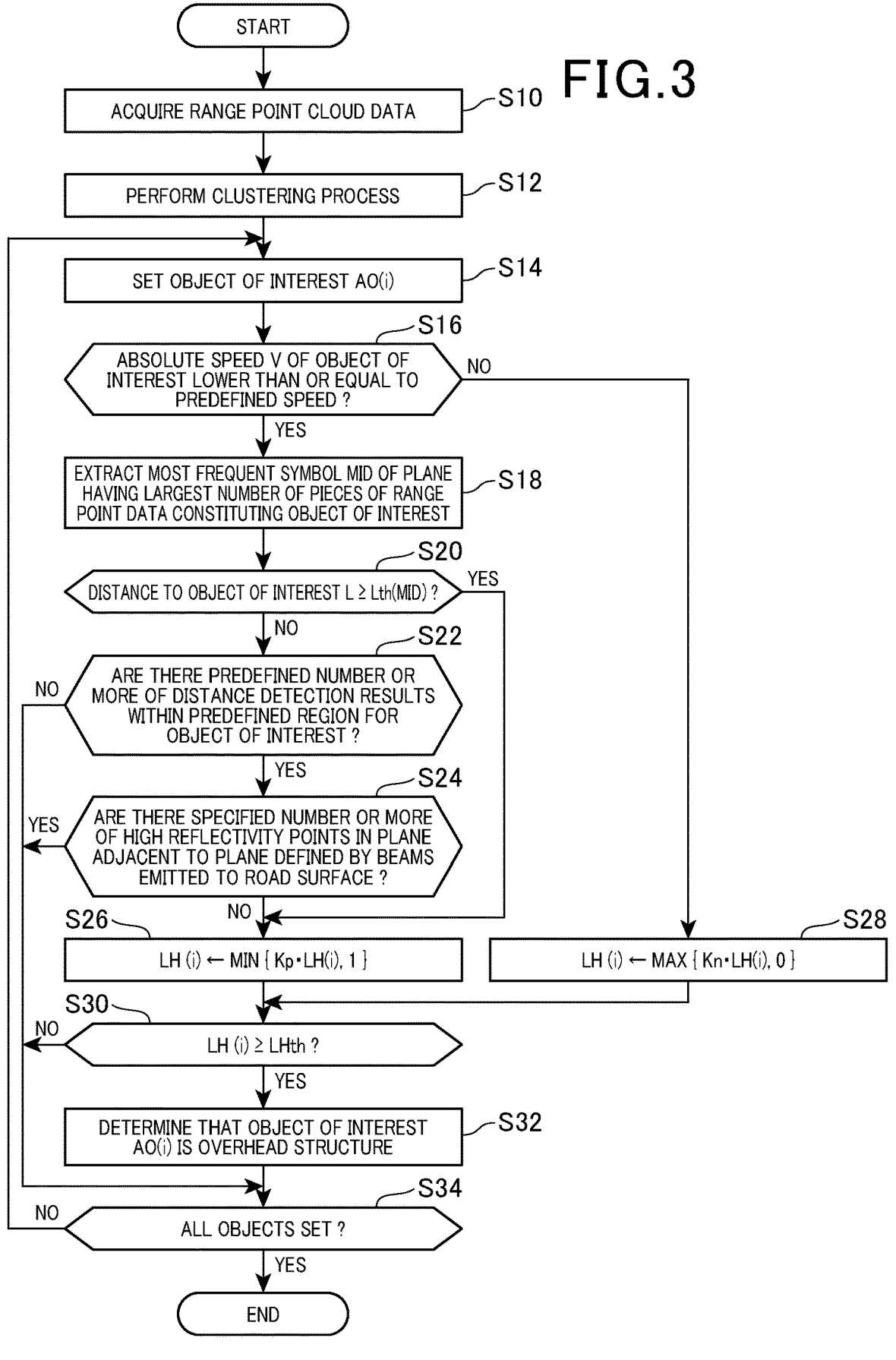

START

ACQUIRE RANGE POINT CLOUD DATA — S10

PERFORM CLUSTERING PROCESS — S12

SET OBJECT OF INTEREST AO(i) — S14

S16
ABSOLUTE SPEED V OF OBJECT OF INTEREST LOWER THAN OR EQUAL TO PREDEFINED SPEED ?    NO

YES

EXTRACT MOST FREQUENT SYMBOL MID OF PLANE HAVING LARGEST NUMBER OF PIECES OF RANGE POINT DATA CONSTITUTING OBJECT OF INTEREST — S18

S20
DISTANCE TO OBJECT OF INTEREST L ≥ Lth(MID) ?    YES

NO

S22
ARE THERE PREDEFINED NUMBER OR MORE OF DISTANCE DETECTION RESULTS WITHIN PREDEFINED REGION FOR OBJECT OF INTEREST ?    NO

YES

S24
ARE THERE SPECIFIED NUMBER OR MORE OF HIGH REFLECTIVITY POINTS IN PLANE ADJACENT TO PLANE DEFINED BY BEAMS EMITTED TO ROAD SURFACE ?    YES

NO

S26
LH (i) ← MIN { Kp·LH(i), 1 }

S28
LH (i) ← MAX { Kn·LH(i), 0 }

S30
LH (i) ≥ LHth ?    NO

YES

DETERMINE THAT OBJECT OF INTEREST AO(i) IS OVERHEAD STRUCTURE — S32

S34
ALL OBJECTS SET ?    NO

YES

END

LARGE

HEIGHT [m]

Hth

30

0

DISTANCE[m]

LARGE

OP7

OP6

OP5

UB

VC

OP3

OVERHEAD-STRUCTURE RECOGNITION DEVICE

CROSS-REFERENCE TO RELATED APPLICATION

This application is a continuation application of International Application No. PCT/JP2021/017136 filed Apr. 30, 2021 which designated the U.S. and claims priority to Japanese Patent Application No. 2020-081325 filed with the Japan Patent Office on May 1, 2020, the contents of each of which are incorporated herein by reference.

BACKGROUND

Technical Field

This disclosure relates to an overhead-structure recognition device.

Related Art

An object recognition device is known that uses a millimeter-wave radar device to identify an iron plate or the like disposed on a road surface which is not an obstacle for a vehicle to travel on, from other vehicles or the like.

BRIEF DESCRIPTION OF THE DRAWINGS

In the accompanying drawings:

FIG. 3 is a flowchart of overhead-structure recognition processing performed by an overhead-structure recognition device;

DESCRIPTION OF SPECIFIC EMBODIMENTS

Figure 1A:
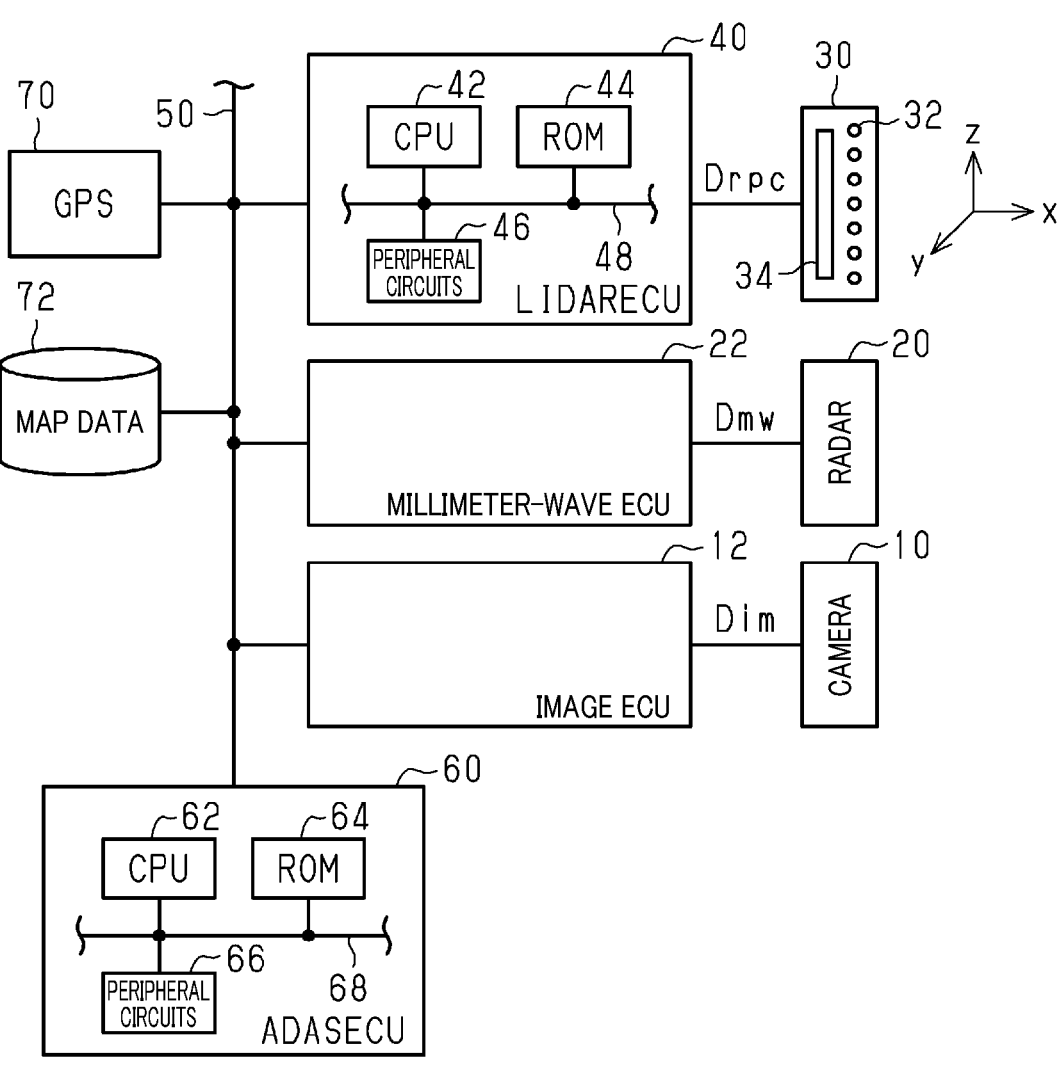
FIG. 1A is a schematic diagram illustrating a configuration of an onboard device according to one embodiment.

Overhead structures, such as signs, signboards, bridges and the like, although not disposed on road surfaces, do not obstruct travel of vehicles. However, the object recognition device, as disclosed in JP 2013-53946 A, does not identify whether an object is an overhead structure.

One aspect of the present disclosure provides an overhead-structure recognition device to be mounted to a vehicle including an acquisition unit, a subdivision unit, and a determination unit. The acquisition unit is configured to, based on received reflected light of laser light emitted from the vehicle in each of a plurality of directions whose horizontal angles different from each other in each of a plurality of planes whose angles with respect to a vertical direction are different from each other, acquire range point cloud data including a plurality of pieces of range point data, each of the plurality of pieces of range point data including a distance variable indicating a distance between the vehicle and an object reflecting the laser light and a direction variable, associated with the distance variable, indicating a direction in which the laser light was emitted. The subdivision unit is configured to, based on the distance variable and the direction variable of each of the pieces of range point data constituting the range point cloud data, subdivide the range point cloud data into a plurality of subsets such that a distance between any pair of positions corresponding to pieces of rage point data belonging to a respective one of the plurality of subsets, from which the laser light was reflected, is less than or equal to a predefined value. The determination unit is configured to, in response to there being, among specific pieces of range point data each having the direction variable indicating a predefined direction, a predefined number or more of pieces of range point data each having the distance variable taking a plurality of values, determine that an object of interest corresponding to a subset of interest, among the plurality of subsets, is an overhead structure which is a structure located above the vehicle that does not obstruct travel of the vehicle. The predefined direction is a direction such that a horizontal angle difference from a direction indicated by the direction variable of the pieces of range point data corresponding to the object of interest is within a predefined angle range and an angle with respect to a vertical direction is greater than an angle between the vertical direction and a direction of travel of the vehicle.

A part of laser light emitted to the road surface may be reflected by a road surface and then redirected back toward the vehicle. Another part of the laser light emitted to the road surface may be reflected by the road surface and then directed in the direction of travel of the vehicle at the same reflection angle as the angle of incidence to the road surface. In a case where the laser light is further reflected by an overhead structure, the reflected light from the overhead structure may be received at the vehicle. In such a case, the distance variable of range point data may take a plurality of values.

In view of the foregoing, the above configuration allows whether the object of interest is an overhead structure to be determined in response to there being the predefined number or more of pieces of range point data each having the distance variable taking a plurality of values, where the range point data used to make such a determination is based on laser light emitted to the road surface, this laser light having a small angle difference in the horizontal direction from the laser light indicated by the range point data corresponding to the object of interest.

Hereinafter, an overhead-structure recognition device according to one embodiment of the present disclosure will be described in detail with reference to the accompanying drawings, in which like reference numerals refer to similar elements and duplicated description thereof will be omitted.

FIG. 1 illustrates an overhead-structure recognition device to be mounted to a vehicle VC according to the present embodiment. As illustrated in FIG. 1, image data Dim that is data regarding images captured by a camera 10 is input to an image ECU 12. ECU is an abbreviation for electronic control unit. The image ECU 12 recognizes objects around the vehicle VC based on the image data Dim. This recognition processing includes determining whether an object detected around the vehicle VC is an overhead structure located above the vehicle VC that does not impede travel of the vehicle VC. Here, the overhead structure may be a sign, a signboard, a bridge or the like.

A millimeter-wave radar device 20 transmits millimeter-wave radar waves to the surroundings of the vehicle VC and receives the millimeter-wave radar waves reflected from an object around the vehicle VC, and thereby outputs signals regarding a distance and a relative speed between the vehicle VC and the object that reflected the millimeter-wave radar, as millimeter-wave data Dmw. The millimeter wave data Dmw is forwarded to the millimeter-wave ECU 22. Based on the millimeter-wave data Dmw, the millimeter-wave ECU 22 performs recognition processing of an object around the vehicle VC. This recognition processing includes a determination process of determining whether the object detected based on the millimeter-wave data Dmw is an overhead structure.

Based on emitting laser light, such as near-infrared light or the like, and receiving its reflected light, a LIDAR device 30 generates range point data indicating a direction variable indicating a direction in which the laser light was emitted, a distance variable indicating a distance between the vehicle VC and the object that reflected the laser light, and a reflection intensity of the object that reflected the laser light. The reflection intensity, which is a physical quantity that indicates the intensity of the received light, indicates the reflectance of the object that reflected the laser light in conjunction with the distance variable. That is, the range point data may be regarded as tuple data composed of the direction variable, the distance variable, and the reflectance variable that is a variable indicating the reflectance of the object that reflected the laser light.

Figures 2A, 2B:
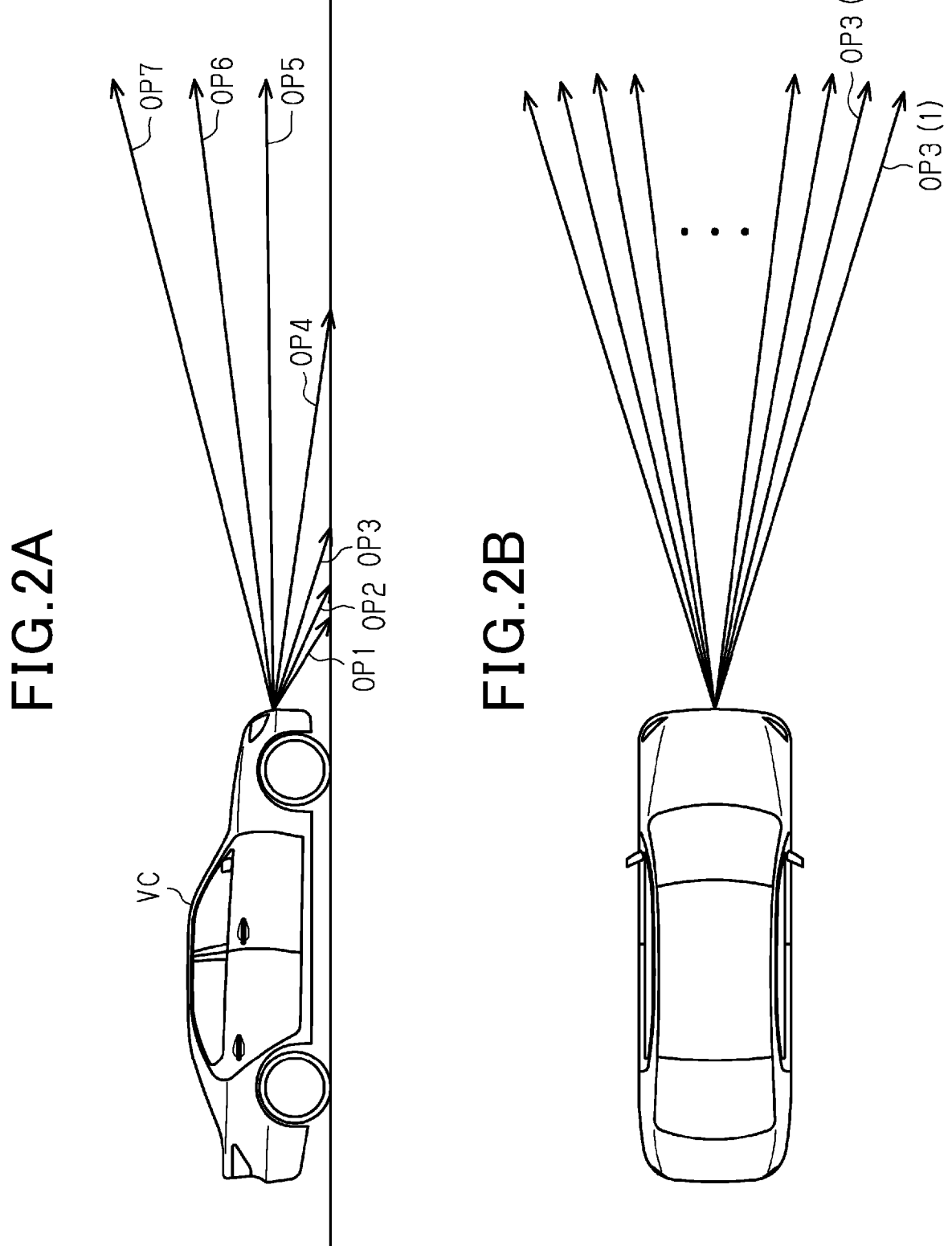
FIG. 2A is a side view illustrating emission of laser light according to the embodiment.
FIG. 2B is a plan view illustrating emission of laser light according to the embodiment.

Specifically, the LIDAR 30 device includes a plurality of light emitting elements 32 arranged along the z-direction that is orthogonal to each of the x-direction (i.e., longitudinal direction) of the vehicle VC and the y-direction (i.e., lateral direction) of the vehicle VC. Angles of optical axes of the respective light emitting elements 32 with the z-direction are different from each other. This means that angles made by the optical axes of the respective light emitting elements 32 with the vertical direction are different from each other. In the following, the upward direction of the vehicle is defined to be a positive direction of the z-axis. FIG. 2A illustrates the optical axes OP1-OP7 of the laser light emitted from the respective light emitting elements 32.

The LIDAR device 30 horizontally scans laser light by emitting the laser light while shifting the optical axis of each light emitting element 32 in the y-direction with the angle fixed between the optical axis of the light emitting element 32 and the z-direction. FIG. 2B illustrates an example of horizontally scanning the laser light along the optical axis OP3. In FIG. 2B, the optical axis OP(1) and the optical axis OP(2) are adjacent to each other in the horizontal direction. The optical axes OP3 (1), OP3 (2), OP3 (3), . . . are lines in a plane defined by a corresponding fixed angle with respect to the z-direction. Similarly, when horizontally scanning the laser light along each of the optical axes OP1, OP2, OP4-OP7, each optical axis is a line in a plane defined by a corresponding fixed angle with respect to the z-direction. That is, when horizontally scanning the laser light along each of the seven optical axes OP1-OP7, each optical axis lies in one of the seven planes whose angles with respect to the z-direction are different from each other.

Returning to FIG. 1, in the LIDAR device 30, a control operation unit 34 horizontally scans the laser light emitted in seven directions having different angles with respect to the vertical direction, from the light emitting elements 32, and generates range point cloud data Drpc based on reflected light of the emitted laser light. The range point cloud data Drpc includes range point data for each of the seven directions having different angles with respect to the vertical direction and for each of horizontally different directions.

In the present embodiment, since a low-resolution LIDAR device 30 with a relatively small number of optical axes OP1-OP7 having different angles with respect to the z-axis is used, which of the optical axes the range point data is based on reflected light of the laser light along is particularly important in expressing vertical position information of the object that reflected the laser light. Therefore, in the present embodiment, each of pieces of range point data that constitute the range point cloud data is classified according to which of the optical axes OP1-OP7 the piece of range point data is based on emission of the laser light along. In detail, each of pieces of range point data that constitute the range point cloud data Drpc is classified according to which of the seven planes mentioned above the piece of range point data is based on, where each of the seven planes includes optical axes acquired by horizontally shifting a corresponding one of the optical axes OP1-OP7. Specifically, each of pieces of range point data that constitute the range point cloud data is classified by assigning an identification symbol to each of the seven planes.

In the present embodiment, the time-of-flight (TOF) method is exemplified as a method for calculating the distance variable. In the present embodiment, a plurality of beams of laser light having different optical axes are not to be emitted at the same timing such that timings of receiving the beams of laser light having different optical axes can be reliably distinguished from each other. In the present embodiment, a dedicated hardware circuit, such as an application specific integrated circuit (ASIC) or the like, that performs laser beam emission control and a generation process of generating the range point cloud data Drpc is exemplified as the control operation unit 34.

A LIDAR ECU 40 performs recognition processing of an object that reflected the laser light based on the range point cloud data Drpc. This recognition processing includes a determination process of determining whether the object recognized based on the range point cloud data Drpc is an overhead structure. In detail, the LIDAR ECU 40 includes a CPU 42, a ROM 44, and peripheral circuits 46, which are communicable with each other via a local network 48. The peripheral circuits 46 include a circuit that generates clock signals to define internal operations, a power supply circuit, a reset circuit, and other circuits. The LIDAR ECU 40 performs the recognition processing by the CPU 42 executing a program stored in the ROM 44.

The image ECU 12, the millimeter-wave ECU 22, and the LIDAR ECU 40 are communicable with the ADAS ECU 60 via an in-vehicle network 50. ADAS is an abbreviation for advanced driver-assistance system. The ADAS ECU 60 performs a process of assisting a user in driving the vehicle VC. In the present embodiment, driving assistance on a limited highway, such as so-called adaptive cruise control for controlling travel of the vehicle VC to achieve a target vehicle speed while giving priority to keeping a distance from the vehicle VC to a forward vehicle at or above a predefined value, is exemplified. The ADAS ECU 60 performs a process of generating a final object recognition result to be finally referred to for driving assistance, based on results of object recognition by the image ECU 12, the millimeter wave ECU 22, and the LIDAR ECU 40. The ADAS ECU 60 refers to position data from the global positioning system (GPS) 70 and map data when generating the final object recognition result.

The ADAS ECU 60 includes a CPU 62, a ROM 64, and peripheral circuits 66, which are communicable with each other via a local network 68.

FIG. 3 illustrates a procedure for overhead structure recognition processing performed by the LIDAR ECU 40 according to the present embodiment. The overhead structure recognition processing illustrated FIG. 3 is implemented by the CPU 42 repeatedly performing the program stored in the ROM 44 every cycle the range point cloud data Drpc is generated. In the following, each step is represented by a number with the prefix "S".

In the sequence of process steps illustrated in FIG. 3, the CPU 42 first acquires the range point cloud data Drpc (at S10). Next, the CPU 42 performs a clustering process (at S12) based on the range point cloud data Drpc. In the present embodiment, the following procedure is exemplified as the clustering process.

(a) The CPU 42 generates a bird's-eye view by projecting points that reflected the laser light onto the xy-plane based on the distance and direction variables indicated by each piece of range point data of the range point cloud data Drpc.

(b) After excluding points corresponding to a road surface from the points projected onto the xy-plane, the CPU 42 classifies some of remaining points, a distance between any pair of points of which is less than or equal to a predefined value, into the same subset. Furthermore, any pair of points, of the remaining points, with a z-directional distance therebetween greater than a predefined value, belong to different subsets.

Each of subsets thus acquired is assumed to correspond to an object that reflected the laser light.

Then, the CPU 42 sets one of objects corresponding to the subsets generated in the clustering process, as an object of interest AO(i) (at S14). The object of interest AO(i) is an object to be determined as to whether it is an overhead structure.

The CPU 42 then determines whether the absolute speed V of the object of interest AO(i) is lower than or equal to a predefined speed (at S16). This is a determination step of determining whether an overhead structure condition is met. In detail, the CPU 42 calculates a relative speed of the object of interest AO(i) relative to the vehicle VC based on a position of the object of interest AO(i) based on the range point cloud data Drpc acquired in the previous cycle of the overhead structure recognition processing illustrated in FIG. 3 and a position of the object of interest AO(i) based on the ranging point group data Drpc acquired in the current cycle. The absolute speed V is then calculated by adding the vehicle speed of the vehicle VC to the relative speed. At the first timing when the object of interest AO(i) is detected, the absolute speed V may be a certain speed that is greater than a predefined speed.

If determining that the absolute speed V is lower than or equal to the predefined speed ("YES" branch of step S16), the CPU 42 classifies pieces of range point data corresponding to the object of interest AO(i) into the above-described seven planes whose angles with respect to the z-direction are different from each other and acquires the most frequent symbol MID that is an identification symbol of the plane with the largest number of pieces of range point data among those seven planes (at S18). That is, the range point cloud data Drpc is a set of pieces of range point data corresponding to the seven optical axes OP1-OP7 illustrated in FIG. 2A. Since each of these seven optical axes OP1-OP7 has directions to be scanned horizontally, the pieces of range point data may be classified into seven planes whose angles with respect to the vertical direction are different from each other.

That is, at S18, which of the seven planes includes the largest number of pieces of range point data forming the object of interest AO(i) is identified, and the identification symbol for that plane is acquired as the most frequent symbol MID.

The CPU 42 determines whether a distance L between the object of interest AO(i) and the vehicle VC is greater than or equal to a threshold Lth (at S20). Here, the threshold Lth is variably set according to the most frequent symbol MID such that the smaller the angle between the optical axis corresponding to the plane indicated by the most frequent symbol MID and the positive direction of the z-axis in FIG. 1, the smaller the threshold Lth.

This step is a determination step of determining whether a vertical distance between the vehicle VC and the object of interest AO(i) is greater than or equal to a specified value Hth.

Figures 4, 5:
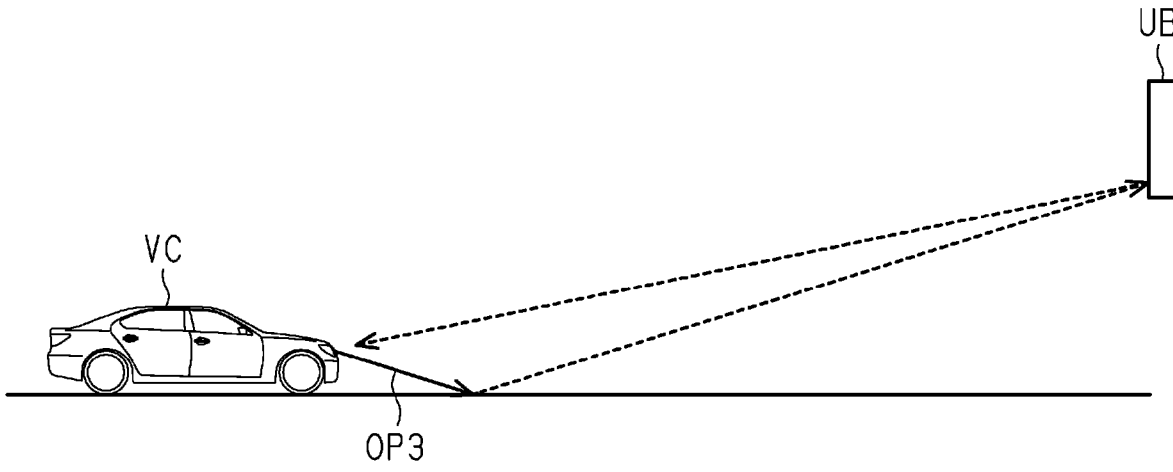
FIG. 4 is an illustration of a process of increasing the likelihood of an overhead structure according to the embodiment.
FIG. 5 is an illustration of the principle of the process of increasing the likelihood of an overhead structure according to the embodiment.

That is, as illustrated in FIG. 4, the plane corresponding to the optical axis OP7 has a smaller angle with respect to the positive direction of the z-axis in FIG. 1 than the plane corresponding to the optical axis OP6, which means that the vertical height increases despite of a shorter distance from the vehicle VC. In other words, despite of a shorter distance from the vehicle VC, the lower limit (specified value Hth) of the assumed vertical distance from a road surface at a location where an overhead structure, such as a sign, a signboard, a bridge or the like, is disposed is easier to reach. Therefore, setting the above threshold Lth to a smaller value for a smaller angle made by the optical axis with the positive direction of the z-axis allows it to be determined whether the vertical distance between the vehicle VC and the object of interest AO(i) is greater than or equal to the specified value Hth.

Returning to FIG. 3, if the distance L between the object of interest AO(i) and the vehicle VC is less than the threshold Lth ("NO" branch of S20), the CPU 42 determines whether there are a predefined number or more of pieces of range point data, each of which has a plurality of detection results for the distance variable, arising from the laser light emitted in a direction whose deviation from the direction corresponding to the object of interest AO(i) is within a predefined region (S22). Horizontally, the predefined region covers both laser light axial ends when the object of interest AO(i) is detected, but covers none of horizontal scanning directional ends of laser light emitted by the LIDAR device 30. Vertically, the predefined region is limited to cover optical axes toward the lower side of travel direction of the vehicle VC. The reason for this definition is to capture cases where a part of the laser light reflected from the road surface is directly received by the LIDAR system 30 and another part of the laser light reflected from the road surface is received by the LIDAR system 30 after being reflected by an overhead structure. In the present embodiment, the predefined number is greater than or equal to two.

As illustrated in FIG. 5, the laser light emitted in the direction of the optical axis OP3 may be reflected by the road surface and is directly received by the LIDAR device 30 as indicated by the solid line. In addition to the laser light being reflected by the road surface and directly received by the LIDAR device 30, the laser light may also be reflected again by an overhead structure UB and then received by the LIDAR device 30 as indicated by the dashed line. In such a case, the corresponding range point data will have a plurality of values as the distance variable.

Returning to FIG. 3, if there are the predefined number or more of pieces of range point data ("YES" branch of S22), the CPU 42 determines whether there are a specified number or more of pieces of range point data, each of which has a reflectance greater than or equal to a predefined value, within a specified region horizontally extending in a plane adjacent to the plane defined by the optical axes of the laser light emitted to the road surface and having a smaller angle with respect to the positive direction of the z-direction than the plane defined by the optical axes (at S24). The specified region covers both laser light axial ends when the object of interest AO(i) is detected, but is narrower than between horizontal scanning directional ends of laser light emitted by the LIDAR device 30. In the horizontal direction, this specified region may be the same as the predefined region in the process of S22. The process at S24 is a process of determining whether the reason for the "YES" answer at S22 is not that there is an overhead structure in the direction of travel of the vehicle, but that there is an object obstructing travel of the vehicle. Here, whether the reflectance is greater than the predefined value is determined by whether the reflection intensity of the range point data is greater than or equal to a determined value. The criterion value is set to a smaller value as the distance to the vehicle VC increases. This can be implemented, for example, by the CPU 42 performing map calculation of the criterion value with map data prestored in the ROM 44, including the distance to the vehicle VC as an input variable and the criterion value as an output variable. The map data is tuple data of discrete values of the input variable and values of the output variable corresponding to the values of the input variable. In the map calculation, for example, if a value of the input variable matches one of the values of input variable in the map data, the value of the output variable in the corresponding map data is used as a calculation result, whereas if the value of the input variable does not match any one of the values of the input variable in the map data, a value acquired by interpolation between plural values of the output variable in the map data may be used as a calculation result. In the present embodiment, the specified number is greater than or equal to two.

Strictly, if the answer is YES at S24, there is a high possibility of there being an object obstructing travel of the vehicle in the travel direction of the vehicle. In consideration of such a fact, the process at S24 is a process for not performing the process at S26 regardless of the presence or absence of an overhead structure. Not that, if reflected light fails to be detected in response to emission of the laser light in a direction, then there is no range point data regarding the laser light emitted in that direction.

If there are less than the specified number of pieces of range point data ("NO" branch of S24) or if the answer is YES at S20, then the CPU 42 updates the likelihood LH(i) of the object of interest AO(i) being an overhead structure to 1 or LH(i) multiplied by a specific coefficient Kp greater than 1, whichever is smaller (at S26). If the likelihood LH(i) multiplied by the specific coefficient Kp greater than 1 is equal to 1, then the CPU 42 substitutes 1 into the likelihood LH(i). The initial value of the likelihood LH is ½.

If the absolute speed V of the object of interest AO(i) is higher than the predefined speed ("NO" branch of S16), then the CPU 42 updates the likelihood LH(i) of the object of interest AO(i) being an overhead structure to 0 or the likelihood LH(i) multiplied by a specific coefficient Kn greater than 0 and less than 1, whichever is larger (at S28). If the likelihood LH(i) multiplied by the specific coefficient Kn greater than 0 and less than 1 is equal to 0, then the CPU 42 substitutes 0 into the likelihood LH(i).

Upon completion of the process at S26 or S28, the CPU 42 determines whether the likelihood LH(i) is greater than or equal to a criterion value LHth (at S30). If it is determined that the likelihood LH(i) is greater than or equal to the criterion value LHth ("YES" branch of S30), the CPU 42 determines that the object of interest AO(i) is an overhead structure (at S32).

If the process at S32 has been completed, if the answer is NO at S22 or S30, or if the answer is YES at S24, the CPU 42 determines whether all of the subsets classified in the clustering process have been set as the object of interest AO (at S34). If there is a subset that has not yet been set as the object of interest AO ("NO" branch of S34), the CPU 42 returns to S14 and sets the object corresponding to that subset as the object of interest AO. The CPU 42 then changes the variable "i" specifying the object of interest AO(i).

If it is determined that all subsets have been set as the object of interest AO(i) ("YES" branch of S34), the CPU 42 terminates the sequence of process steps illustrated in FIG. 3.

Figure 6:
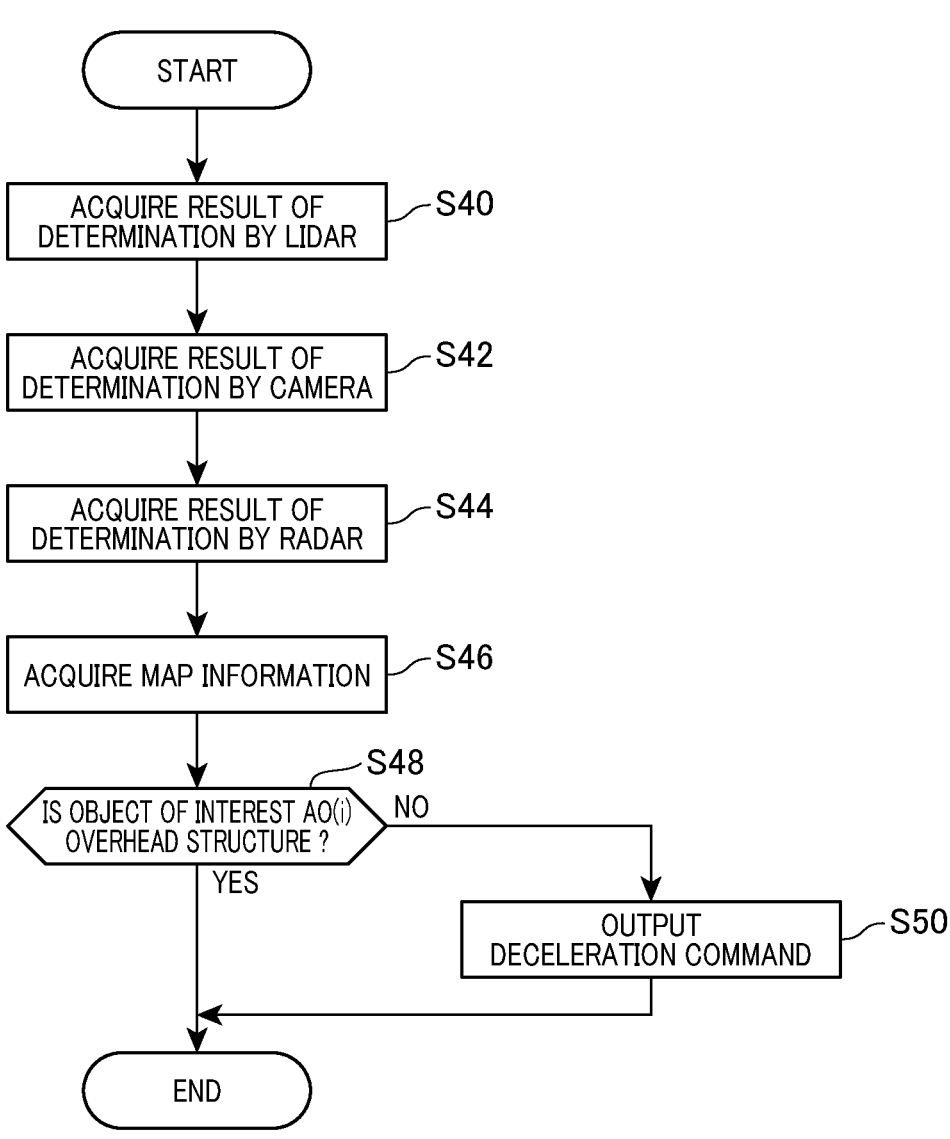
FIG. 6 is a flowchart of overhead-structure determination processing performed by the overhead-structure recognition device according to the embodiment.

FIG. 6 illustrates a procedure for the ADAS ECU 60 to finally determine an overhead structure. The process flow illustrated in FIG. 6 is implemented by the CPU 62 repeatedly performing the program stored in ROM 64 every predefined cycle.

In the sequence of process steps illustrated in FIG. 6, the CPU 62 first acquires the result of determination by the LIDAR ECU 40, the result of determination by the image ECU 12, and the result of determination by the millimeter-wave ECU 22, regarding the determination as to whether object of interest AO(i) is an overhead structure and some determinations to be used for the same determination, at S40-S44. Subsequently, the CPU 42 acquires information regarding the slope of a road surface on which the vehicle VC is traveling, and whether there is an overhead structure, such as a bridge ahead or the like, based on position data from the GPS 70 and map data 72 (S46). Then, based on the acquired information and each acquired determination result, the CPU 62 determines whether the object of interest AO(i) is an overhead structure (S48). If it is determined that the object of interest AO(i) is not an overhead structure ("NO" branch of S48), the CPU 62 outputs a deceleration command to decelerate the vehicle VC by operating the brake actuator (S50). If the process at S50 has been completed or if the answer is YES at S48, the CPU 42 terminates the sequence of process steps illustrated in FIG. 6.

Figure 1B:
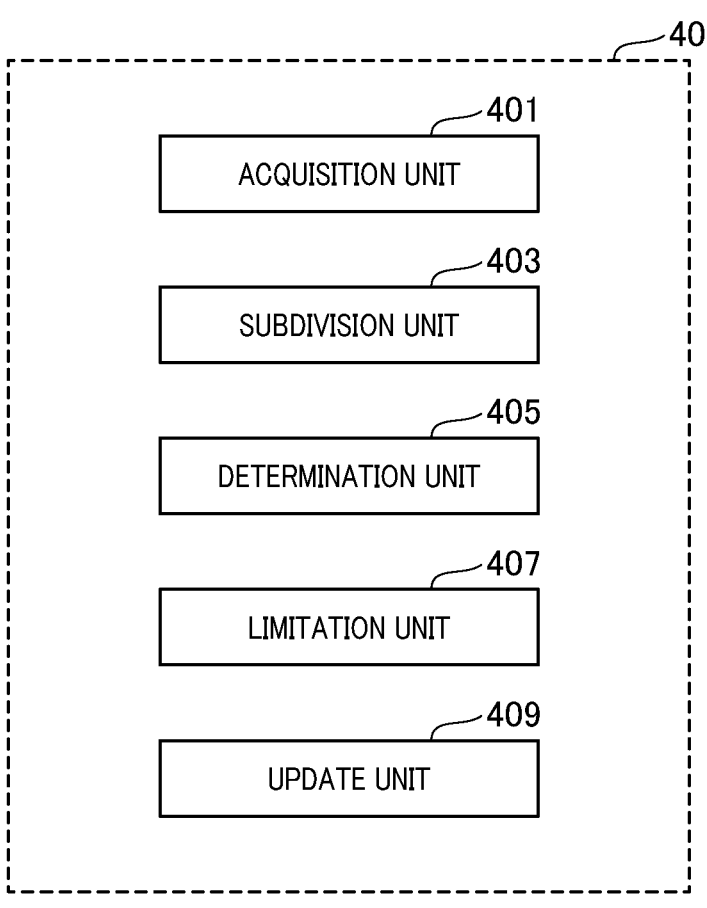
FIG. 1B is a functional block diagram of a LIDAR ECU.

As illustrated in FIG. 1B, the LIDAR ECU 40 includes, as functional blocks, an acquisition unit 401 responsible for execution of step S10 of the overhead-structure recognition processing illustrated in FIG. 3, a subdivision unit 403 responsible for execution of step S12 of the overhead-structure recognition processing, a determination unit 405 responsible for execution of steps S22-S26 of the overhead-structure recognition processing, a limitation unit 407 responsible for execution of step S16 of the overhead-structure recognition processing, and an update unit 409 responsible for execution of step S26 of the overhead-structure recognition processing. Functions of these blocks are implemented by the CPU 42 reading the program(s) from a non-transitory, tangible, computer-readable storage medium (or a non-transitory memory), i.e., the ROM 44, and executing these programs using a RAM (not shown) as a work area.

Figure 1C:
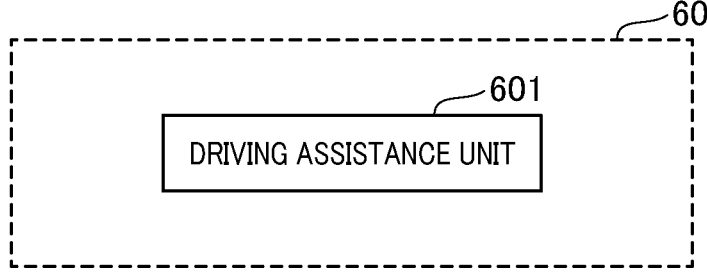
FIG. 1C is a functional block diagram of an ADAS ECU.

As illustrated in FIG. 1C, the ADAS ECU 60 includes, as a functional block, a driving assistance unit 601 responsible for execution of steps S40-S50 of the overhead-structure determination processing illustrated in FIG. 6. The function of this block is implemented by the CPU 62 reading the program(s) from a non-transitory, tangible, computer-readable storage medium (or a non-transitory memory), i.e., the ROM 64, and executing this program using a RAM (not shown) as a work area.

The functions and advantages of the present embodiment will now be described.

The CPU 42 determines whether there are a predefined number or more of pieces of range point data, each of which has a plurality of detection results for the distance variable, arising from the laser light emitted in a direction whose deviation from the direction corresponding to the object of interest AO(i) is within a predefined region. In response to determining that there are the predefined number or more of pieces of range point data, the CPU 42 increases the likelihood LH(i) of the object of interest AO(i) being an overhead structure. This may increase the likelihood LH(i) that the object of interest AO(i) is an overhead structure when the reflected light is received by the LIDAR device 30 after reflection of laser light on the road surface.

The present embodiment described above can further provide the following advantages.

(1) The object of interest AO(i) to be determined as to whether it is an overhead structure is limited to those whose absolute speed is lower than or equal to a predefined speed. This allows the object of interest AO(i) to be recognized as an overhead structure with high accuracy, based on the fact that signboards, signs, poles or the like are stationary.

(2) In response to the likelihood LH(i) being greater than or equal to the criterion value LHth, the object of interest AO(i) is determined to be an overhead structure. Even though either only the "YES" determination at S20 or only the "NO" determination at S24 does not lead to a high likelihood of the object of interest AO(i) being an overhead structure, the accuracy of the process at S32 may be improved.

(3) In response to there being the specified number or more of pieces of range point data with high reflectance in reflected light of the laser light emitted in a direction slightly upward from the road surface, the CPU 42 does not increase the likelihood LH(i) that the object of interest AO(i) is an overhead structure even in a case where it is determined that there are the predefined number or more of pieces of range point data. This prevents the likelihood LH(i) that the object of interest AO(i) is an overhead structure from being increased despite the presence of an object obstructing travel of the vehicle in the vicinity of the object of interest AO(i).

(4) Regardless of whether there are the predefined number of pieces of range point data with a plurality of values of the distance variable, the likelihood LH(i) of the object of interest AO(i) being an overhead structure is increased in response to a vertical distance between the object of interest AO(i) and the vehicle is greater than or equal to the specified value Hth. This can prevent the situation from occurring where the process at S50 is performed even in a case where the object of interest AO(i) is an overhead structure.

(5) The height of the object of interest AO(i) for determining whether the vertical distance between the vehicle and the object of interest AO(i) is greater than or equal to the specified value is quantified by the plane with the largest number of range point data constituting the object of interest AO(i). For example, even if the signboard is supported by a pillar and pieces of range point data corresponding to the reflected light from the pillar and signboard are considered to belong to the same subset, this allows a determination as to whether the vertical distance to the object of interest AO(i) is greater than or equal to the specified value based on the height of the signboard.

(6) The final determination as to whether the object of interest AO(i) is an overhead structure, which is to be referred to when performing driving assistance, is made by the CPU 62 using, in addition to the result of determination by the LIDAR ECU 40, the result of determination by the image ECU 12, the result of determination by the millimeter-wave ECU 22, and information regarding the map data. Using sensor fusion in this way allows a more accurate determination as to whether the object of interest AO(i) is an overhead structure to be made.

Other Embodiments

The present embodiment may be implemented with the following modifications. The present embodiment and the following modifications may be implemented in combination with each other to the extent that they are technically consistent.

Regarding process based on difference in altitude from object of interest:

(A1) The process of determining whether the vertical distance between the vehicle VC and the object of interest AO(i) is greater than or equal to the specified value Hth is not limited to the process at S20. Alternatively, for example, the sine of an angle between the plane with the largest number of pieces of range point data corresponding to the object of interest and the horizontal plane, multiplied by the distance L, may be compared with a threshold value. Here, the threshold value may be to be greater than or equal to the above specified value Hth.

(A2) The process of determining whether the vertical distance between the vehicle VC and the object of interest AO(i) is greater than or equal to the specified value Hth is not limited to using only the range point data in the plane with the largest number of pieces of range point data corresponding to the object of interest. Alternatively, for example, it may be determined whether an average difference between the height indicated by all of the pieces of range point data constituting the object of interest AO(i) and the height at which the vehicle VC is located is greater than or equal to a criterion value. Here, the criterion value is set by taking into account the effect on the height of the object of interest AO(i) due to a low height indicated by the range point data corresponding to light reflected from a pillar supporting a signboard or the like.

Regarding process of updating likelihood:

(A3) As illustrated in FIG. 3, in a case where the answer is NO at S16, the likelihood LH(i) of the object of interest AO(i) being an overhead structure is reduced by a predefined amount under the condition that LH(i) is kept at or above zero. Alternatively, for example, the process flow may return to S14 and change the object of interest AO(i).

(A4) In the above embodiment, the amount of update in updating the likelihood is determined based on predefined fixed values of specific coefficients Kp and Kn. Alternatively, the amount of update may be variably set according to a condition under which an update is to be made. For example, the amount of update of the likelihood may be greater in a case where the answer is NO at S24 than in a case where the answer is YES at S20. In such an embodiment, in a case where the answer is YES at S24, the likelihood LH(i) of the object of interest AO(i) being an overhead structure may be decreased by an amount of update whose absolute value is less than an amount by which the likelihood LH(i) is increased at S26.

Regarding determination processes:

(A5) The predefined number in the process at S22 may be set to 1.

(A6) The specified number in the process at S24 may be set to 1.

(A7) For example, where adequate driving assistance may be provided when it is determined that there is an object in the vicinity of the object of interest AO(i) that obstructs travel of the vehicle by separately recognizing objects other than overhead structures, the process at S24 may be omitted.

(A8) The determination process of determining whether the object of interest AO(i) is an overhead structure is not limited to the process of determining that the object of interest AO(i) is an overhead structure in response to the likelihood LH(i) of the object of interest AO(i) being greater than or equal to the criterion value LHth. For example, a discriminant function may be used that receives the result of determination at each of the processes at S20, S22, and S24 as input and outputs a result of determination as to whether the object of interest AO(i) is an overhead structure.

(A9) It is not imperative to perform the determination process of determining whether the object of interest AO(i) is an overhead structure based only on the range point cloud data Drpc output by the LIDAR 30. For example, a discriminant function may be used that receives, in addition to the result of determination by each of the processes at S20, S22, and S24, feature amounts extracted from image data Dim, feature amounts extracted from millimeter-wave data output by the millimeter-wave radar device 20, and feature amounts extracted from map data 72 as input and outputs a result of determination as to whether the object of interest AO(i) is an overhead structure.

Regarding speed limitation:

(A10) It is not imperative to perform the process of limiting the object of interest subjected to a determination as to whether it is an overhead structure to an object whose speed is lower than the predefined speed.

Regarding LIDAR device:

(A11) In the above embodiment, the LIDAR device 30 having seven directions whose angles with respect to the vertical direction are different from each other is exemplified. It is not imperative to provide a separate light emitting element for each of directions whose angles with respect to the vertical direction are different from each other. For example, a single light emitting element may scan laser light not only in the horizontal direction but also in the vertical direction. Alternatively, the LIDAR device 30 is not limited to a LIDAR device scanning the laser light in the horizontal direction, but may be a flash LIDAR.

Regarding LIDAR ECU:

(A12) In the above embodiment, the LIDAR device 30 and the LIDAR ECU 40 are separate devices that are communicable with each other. Alternatively, the LIDAR device 30 and the LIDAR ECU 40 may be integrated into a single device.

Regarding overhead-structure recognition device:

(A13) In the above embodiment, the ADAS ECU 60 performs the final determination as to whether the object of interest AO(i) is an overhead structure with reference to the map data 72, but it is not imperative to refer to the map data 72.

(A14) The overhead-structure recognition device set forth above is configured to include the LIDAR ECU 40, the millimeter-wave ECU 22, the image ECU 12, and the ADAS ECU 60. Alternatively, the overhead-structure recognition device may be configured to include the LIDAR ECU 40 and the image ECU 12 but not include the millimeter-wave ECU 22, or may be configured to include the LIDAR ECU 40 and the millimeter-wave ECU 22 but not include the image ECU ECU 12. Still alternatively, the overhead-structure recognition device may be configured to include only the LIDAR ECU 40, where the ADAS ECU 60 may be configured to perform driving assistance based only on results of determination by the LIDAR ECU 40.

(A15) The overhead structure recognition device is not limited to those including the CPU and the ROM to perform software processing. For example, at least part of what is software processed in the above embodiment may be provided in a dedicated hardware circuit (e.g., ASIC or the like) that performs hardware processing. That is, the overhead-structure recognition device may be in any one of the following configurations (a) through (c).

(a) The overhead-structure recognition device may include at least one software execution device formed of a processing unit and a program storage device (e.g., a ROM or the like), that executes all of the above processes according to one or more programs stored in the program storage device.

(b) The overhead-structure recognition device may include at least one software execution device formed of a processing unit and a program storage device, that executes some of the above processes according to one or more programs, and at least one dedicated hardware circuit that performs the rest of the processes.

(c) The overhead-structure recognition device may include at least one dedicated hardware circuit that performs all of the above processes.

In any one of the above configurations (a)-(c), the at least one software execution device may include a plurality of software execution devices, and the at least one dedicated hardware circuit may include a plurality of dedicated hardware circuits.

Regarding driving assistance process:

(A16) The driving assistance process is not limited to a deceleration process in which an braking actuator is to be operated. For example, the driving assistance process may be a process of outputting an audio signal to alert the driver by operating a speaker. In short, the driving assistance process may be a process of operating a specific electronic device for driving assistance.

Others:

(A17) The method of measuring a distance to an object reflecting the laser light is not limited to the TOF method. For example, it may be a method using the FMCW or AMCW.

While the present disclosure has been described with reference to the embodiments, it is understood that the present disclosure is not limited to such embodiments and structures. The present disclosure includes various modifications and modifications within the equivalent range. Additionally, various combinations and forms, as well as other combinations and forms including only one element, more or less, are within the scope and spirit of the present disclosure.

What is claimed is:

1. An overhead-structure recognition device for a vehicle, comprising:

an acquisition unit configured to, based on received reflected light of laser light emitted from the vehicle in each of a plurality of directions whose horizontal angles different from each other in each of a plurality of planes whose angles with respect to a vertical direction are different from each other, acquire range point cloud data including a plurality of pieces of range point data, each of the plurality of pieces of range point data including a distance variable indicating a distance between the vehicle and an object reflecting the laser light and a direction variable, associated with the distance variable, indicating a direction in which the laser light was emitted;

a subdivision unit configured to, based on the distance variable and the direction variable of each of the pieces of range point data constituting the range point cloud data, subdivide the range point cloud data into a plurality of subsets such that a distance between any pair of positions corresponding to pieces of range point data belonging to a respective one of the plurality of subsets, from which the laser light was reflected, is less than or equal to a predefined value; and a determination unit configured to, in response to there being, among specific pieces of range point data each having the direction variable indicating a predefined direction, a predefined number or more of pieces of range point data each having the distance variable taking a plurality of values, determine that an object of interest corresponding to a subset of interest, among the plurality of subsets, is an overhead structure which is a structure located above the vehicle that does not obstruct travel of the vehicle, the predefined direction being a direction such that a horizontal angle difference from a direction indicated by the direction variable of the pieces of range point data corresponding to the object of interest is within a predefined angle range and an angle with respect to a vertical direction is greater than an angle between the vertical direction and a direction of travel of the vehicle.

2. The overhead-structure recognition device according to claim 1, further comprising:

a limitation unit configured to limit the object of interest to be determined as to whether it is an overhead structure, to those whose speed is lower than or equal to a predefined speed.

3. The overhead-structure recognition device according to claim 1, further comprising:

an update unit configured to repeatedly determine whether there are, among the specific pieces of range point data, the predefined number or more of pieces of range point data each having the distance variable taking the plurality of values, and each time it is determined that there are the predefined number or more of pieces of range point data, increase a likelihood of the object of interest being an overhead structure, thereby updating the likelihood, wherein the determination unit is configured to, in response to the likelihood being greater than or equal to a criterion value, determine that the object of interest being the overhead structure.

4. The overhead-structure recognition device according to claim 3, wherein the update unit is configured to, in response to there being a specified number or more of pieces of range point data each having the direction variable indicating a specific direction even in a case where there are, among the specific pieces of range point data, the predefined number or more of pieces of range point data each having the distance variable taking the plurality of values, not increase the likelihood, wherein the specific direction is a direction, a horizontal angle difference between which and the direction indicated by the direction variable of the pieces of range point data corresponding to the object of interest is within a specified angle range, and which is vertically adjacent direction toward a road surface.

5. The overhead-structure recognition device according to claim 3, wherein the update unit is configured to, regardless of whether there are, among the specific pieces of range point data, the predefined number or more of pieces of range point data each having the distance variable taking the plurality of values, increase the likelihood in response to a vertical distance between the object of interest and the vehicle being greater than or equal to a specified value.

6. The overhead-structure recognition device according to claim 5, wherein the update unit is configured to, in response to the subset of interest indicating the object of interest including the pieces of range point data based on reflected light of the laser light emitted in two or more directions whose angles with respect to the vertical direction are different from each other, determine whether the vertical distance between the object of interest and the vehicle is greater than or equal to the specified value, by selectively using the pieces of range point data corresponding to one of the two or more directions, to which the largest number of pieces of range point data correspond.

7. The overhead-structure recognition device according to claim 1, further comprising a driving assistance unit configured to determine whether the object of interest is an overhead structure by taking into account not only a result of determination by the determination unit, but also signals other than the received reflected laser light, including at least one of a signal indicating an image of surroundings of the vehicle, a signal regarding reflected waves arising from emission of millimeter waves from the vehicle, and a signal indicating map information at a location of the vehicle.

8. The overhead-structure recognition device according to claim 7, wherein the driving assistance unit is configured to, in response to determining that the object of interest is not an overhead structure, output a deceleration command to decelerate the vehicle by operating a brake actuator.

* * * * *